US006525669B1

(12) United States Patent
Ohashi et al.

(10) Patent No.: US 6,525,669 B1
(45) Date of Patent: Feb. 25, 2003

(54) RECEIVER FOR REMOTE CONTROL AND REMOTE CONTROL SYSTEM HAVING PLURAL SUCH RECEIVERS

(75) Inventors: Shinichiro Ohashi, Hyogo (JP); Yoshio Inoue, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,473

(22) Filed: Dec. 17, 1999

(30) Foreign Application Priority Data

Jun. 17, 1999 (JP) .......................................... 11-170876

(51) Int. Cl.[7] ............................................. G05B 19/02

(52) U.S. Cl. ............................. 340/825.22; 340/825.24

(58) Field of Search ................................ 340/5.1, 5.22, 340/5.23, 3.71, 825.22, 825.23, 825.24, 825.69, 825.72; 709/204, 205; 725/108, 109, 131, 133

(56) References Cited

U.S. PATENT DOCUMENTS

| | | | | | |
|---|---|---|---|---|---|
| 5,132,679 | A | * | 7/1992 | Kubo | 340/825.22 |
| 5,400,246 | A | * | 3/1995 | Wilson et al. | 340/3.71 |
| 5,482,753 | A | | 1/1996 | Langan et al. | 428/40.8 |
| 5,619,251 | A | * | 4/1997 | Kuroiwa et al. | 348/12 |
| 6,131,111 | A | * | 10/2000 | Yoshino et al. | 709/204 |

FOREIGN PATENT DOCUMENTS

| | | | |
|---|---|---|---|
| GB | 2176639 | A | 12/1986 |
| GB | 2266174 | A | 10/1993 |
| GB | 2272551 | A | 5/1994 |
| GB | 2319373 | A | 5/1998 |
| JP | 2-194797 | | 8/1990 |
| JP | 9-224081 | | 8/1997 |
| JP | 9-261355 | | 10/1997 |
| JP | 10-155188 | | 6/1998 |
| WO | WO98/00788 | | 1/1998 |

OTHER PUBLICATIONS

Photocopy of http://www.x10.com/8welcome_how.htm, Mar. 24, 1999.

Search Report from the United Kingdom Patent Office dated Sep. 5, 2000.

* cited by examiner

*Primary Examiner*—Van Trieu
(74) *Attorney, Agent, or Firm*—McDermott, Will & Emery

(57) ABSTRACT

In a remote control system according to the present invention, a plurality of receivers are arranged for a network. Each receiver has an unique ID number. A control unit controls an operation of each receiver through the network. An input unit uses the unique ID number in each receiver for registration in the control unit. Thus, the control unit individually manages (controls) each receiver through the network. Thus, a plurality of receivers of the same type can be individually managed.

12 Claims, 8 Drawing Sheets

55

| NO. | ID | NAME OF CONTROLLED OBJECT |
|---|---|---|
| 1 | 4531786 | SPRINKLER |
| 2 | 6502848 | 2F BEDSIDE LAMP |
| 3 | 5344765 | 1F TV |
| ⋮ | ⋮ | ⋮ |

RECEIVER FOR REMOTE CONTROL AND REMOTE CONTROL SYSTEM HAVING PLURAL SUCH RECEIVERS

BACKGROUND OF THE INVENTION

1. Field of the Invention

The present invention relates to a remote control system, and more particularly, it relates to a remote control system capable of distinctively remotely controlling a plurality of receivers respectively.

2. Description of the Prior Art

In general, a remote control system remotely controls a plurality of receivers through a network. A typical and conventional remote control system 9000 is illustrated in FIG. 12. Referring to FIG. 12, the conventional remote control system 9000 is formed by a control unit 91, a plurality of receivers controlled by the control unit 91 and a network 98. The network 98 is a power line. The control unit 91 includes an infrared remote control (not shown), a receiver (not shown) for the infrared remote control and a power line interface (not shown). The control unit 91 remotely controls the plurality of receivers through the network 98.

FIG. 12 shows typical receivers 92*a* and 92*b*. The receivers 92*a* and 92*b* are connected with loads 93*a* and 93*b* respectively. The receivers 92*a* and 92*b* include power line interfaces (not shown) and switches (not shown) supplying power to the loads 93*a* and 93*b* respectively. The receivers 92*a* and 92*b* further include rotary switches 97*a* and 97*b* respectively.

In order to drive a load for a specific receiver, the control unit 91 transmits a command including a device code (set value of a rotary switch) for the corresponding load. This command is transmitted to all receivers through the network 98. A receiver including a rotary switch having a set value matching with the device code included in the command received from the control unit 91 supplies power to the load.

A system connecting a plurality of printers to a USB (Universal Serial Bus) and controlling printing operations of the plurality of printers through a computer can also be mentioned as a typical remote control system.

According to the conventional remote control system 9000 supplying a device code for the rotary switch, the set value is limited. When forming a home network for remotely controlling a plurality of receivers of the same type with the conventional remote control system 9000, therefore, there is a possibility for interference with a network of a neighboring house.

When controlling a plurality of printers of the same type through a USB, the user cannot recognize which printer makes printout in advance of actual printing. In other words, the printers of the same type cannot be distinctively remotely controlled.

Further, the number of remotely controlled receivers tends to increase, and it is necessary to automatically manage such a large number of receivers while distinguishing the same from each other.

SUMMARY OF THE INVENTION

Accordingly, an object of the present invention is to provide a remote control system capable of properly remotely controlling a plurality of receivers while distinguishing the same from each other.

The remote control system according to the present invention comprises a plurality of receivers each supplied with an unique identification number, a control unit remotely controlling each of the receivers through a signal transmission line and an input unit inputting the identification number of each of the receivers. The control unit includes a first memory storing the identification number inputted from the input unit, an operation control circuit issuing a command for making a selected receiver execute a specific operation with the identification number stored in the first memory, and a transmission circuit for transmitting the command to the signal transmission line, and each of the receivers includes a second memory storing the identification number, a receiving circuit for receiving the command from the signal transmission line and a circuit recognizing the command, for executing the specific operation when the identification number included in the command matches with the identification number stored in the second memory.

Preferably, the second memory includes a nonvolatile memory.

Preferably, the corresponding identification number is printed on a case or outer housing of each receiver, the input unit includes a keyboard, and the user inputs the identification number printed on the case through the keyboard.

Preferably, the corresponding identification number is printed on a case of each receiver, and the input unit includes an image scanner recognizing and capturing the identification number printed on the case.

Preferably, the corresponding identification number is printed on a case of each receiver in the form of a bar code, and the input unit includes a bar code reader capturing the bar code printed on the case.

Preferably, the corresponding identification number is printed on a case of each receiver, the input unit includes a personal computer including a keyboard and a display supporting input through the keyboard, and the user inputs the identification number printed on the case through the keyboard.

Thus, the principal advantage of the remote control system according to the present invention resides in that the unique identification number of each receiver can be registered in the control unit, and hence interference with a network in a neighboring house can be prevented also when forming a home network. The control unit can individually recognize, manage and control a plurality of receivers of the same type. Maintenance of the unique identification number is enabled by storing the same in a nonvolatile memory. The user can readily register the identification number in the control unit in the house.

A remote control system according to another aspect of the present invention comprises a plurality of receivers each supplied with an unique identification number and a control unit issuing a command and remotely controlling each of the receivers through a signal transmission line on the basis of the command. Each of the receivers includes a first memory storing the identification number and a first transmission/receiving circuit transmitting the identification number read from the first memory to the signal transmission line and receiving the command from the signal transmission line, the control unit includes a second transmission/receiving circuit receiving the identification number from the signal transmission line and transmitting the command to the signal transmission line, a second memory storing the received identification number and an operation control circuit issuing the command for making a selected receiver execute a specific operation with the identification number stored in the second memory, and each of the plurality of receivers executes the specific operation when the identification number included in the command matches with the identification number stored in the first memory.

Preferably, the first memory includes a nonvolatile memory.

Preferably, the signal transmission line includes a first signal transmission line transmitting the identification number and a second signal transmission line transmitting the command, the first transmission/receiving circuit includes a first transmission circuit corresponding to the first signal transmission line and a first receiving circuit corresponding to the second signal transmission line, and the second transmission/receiving circuit includes a second receiving circuit corresponding to the first signal transmission line and a second transmission circuit corresponding to the second signal transmission line.

Accordingly, a further advantage of the inventive remote control system resides in that the unique identification numbers of the arranged receivers can be automatically registered in the control unit through the network, and hence a burden or erroneous registration on the user side can be prevented. Further, interference with a network in a neighboring house can be prevented also when forming a home network. The control unit can distinctively recognize, manage and control receivers of the same type. In addition, maintenance of the unique identification number is enabled by storing the same in a nonvolatile memory.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[First Embodiment]

Figure 1:
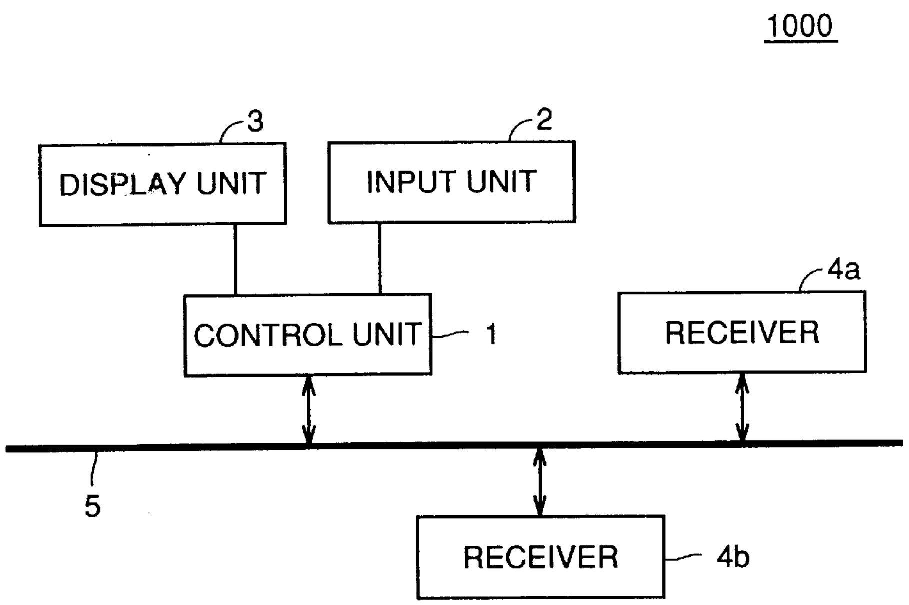
FIG. 1 is a diagram for illustrating a remote control system 1000 according to a first embodiment of the present invention.

A remote control system 1000 according to a first embodiment of the present invention is illustrated in FIG. 1. In the following description, identical components are denoted by the same reference numerals and symbols, and redundant description is not repeated.

Referring to FIG. 1, the remote control system 1000 comprises a plurality of receivers, a control unit 1, and an input unit 2 and a display unit 3 arranged for the control unit 1. The control unit 1 remotely controls each of the receivers through a network 5.

FIG. 1 illustrates representative receivers 4*a* and 4*b* (hereinafter generically referred to as receivers 4). Each receiver 4 includes a nonvolatile memory for storing an unique identification number in place of a rotary switch. The unique identification number hereinafter referred to as ID number) not overlapping with those of other receivers is written in the nonvolatile memory in shipping. In shipping, further, a symbol indicating the ID number is specified on a case of the receiver 4 in the form of characters or a bar code, for example.

The control unit 1 includes a memory for storing the ID numbers of the receivers 4. The user registers information (including the ID numbers) related to the receivers 4 in the control unit 1 through the input unit 2. The input unit 2 is formed by a keyboard, an image scanner unit including an image scanner and a recognition circuit recognizing a signal loaded through the image scanner, a bar code reader or a wireless data communication unit using infrared radiation or a radio wave, for example.

The display unit 3 displays input information, storage information of the control unit 1, an instruction from the control unit 1 and the like. For example, a personal computer including a keyboard (the input unit 2) and a display (the display unit 3) is arranged.

Figure 2:
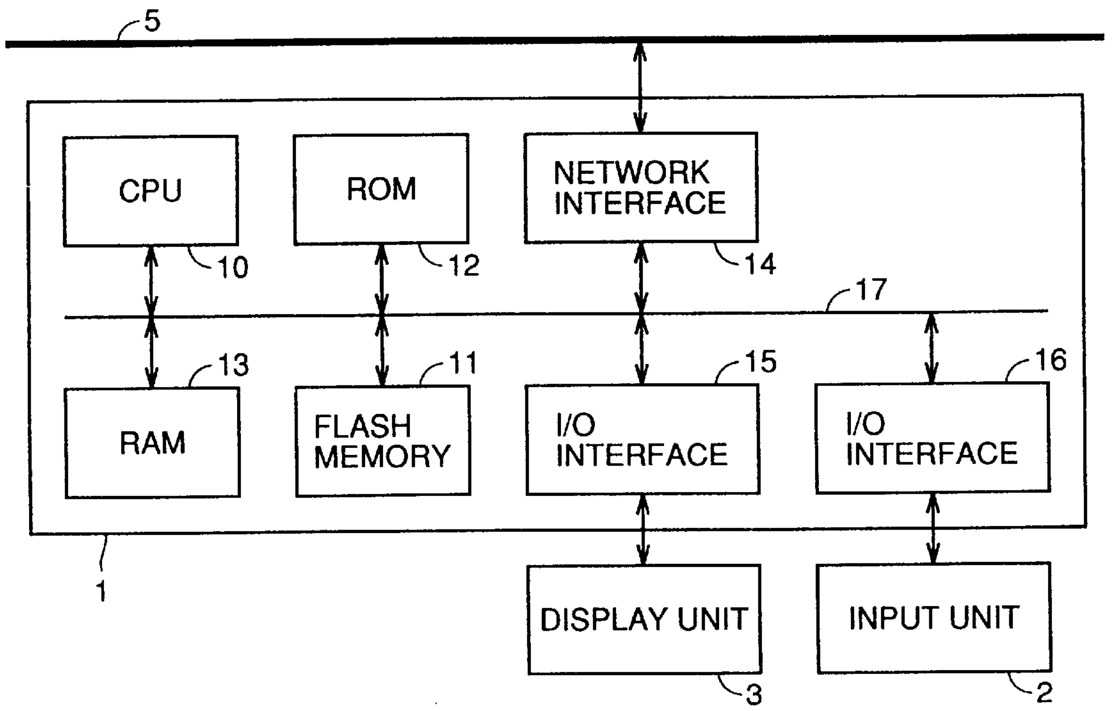
FIG. 2 is a diagram for illustrating a typical structure of a control unit 1 in the first embodiment of the present invention.

A typical structure of the control unit 1 in the first embodiment of the present invention is described with reference to FIG. 2. Referring to FIG. 2, the control unit 1 includes a CPU 10, a flash memory 11, storing the ID number of each receiver 4, arranged for the network 5, a ROM 12 storing various programs including a registration program and a control program, a RAM 13 for executing the programs stored in the ROM 12, a network interface 14 implementing bidirectional communication between the network 5 and the control unit 1, an I/O interface 15 implementing bidirectional communication between the display unit 3 and the control unit 1, an I/O interface 16 enabling bidirectional communication between the input unit 2 and the control unit 1, and a bus 17.

The CPU 10 controls the flash memory 11, the ROM 12, the RAM 13, the network interface 14 and the I/O interfaces 15 and 16 through the bus 17 respectively.

The control unit 1 captures the ID numbers from the input unit 2 in accordance with the registration program and stores (registers) the same in the flash memory 11. More preferably, the control unit 1 forms a management table storing the ID numbers in association with information of the receivers 4 corresponding to the ID numbers, such as information on apparatuses controlled by the receivers 4, for example.

The control unit 1 controls each of the receivers 4 in accordance with the stored ID numbers. More specifically, the control unit 1 reads the ID number corresponding to a selected receiver 4 from the flash memory 11 in accordance with the control program and issues a command for making the selected receiver 4 execute a specific operation including the read ID number.

The control unit 1 is not restricted to that shown in FIG. 2. For example, the information stored in the flash memory 11 may be stored in the RAM 13. Further, the ROM 12 may be deleted so that the flash memory 11 stores the programs.

Figure 3:
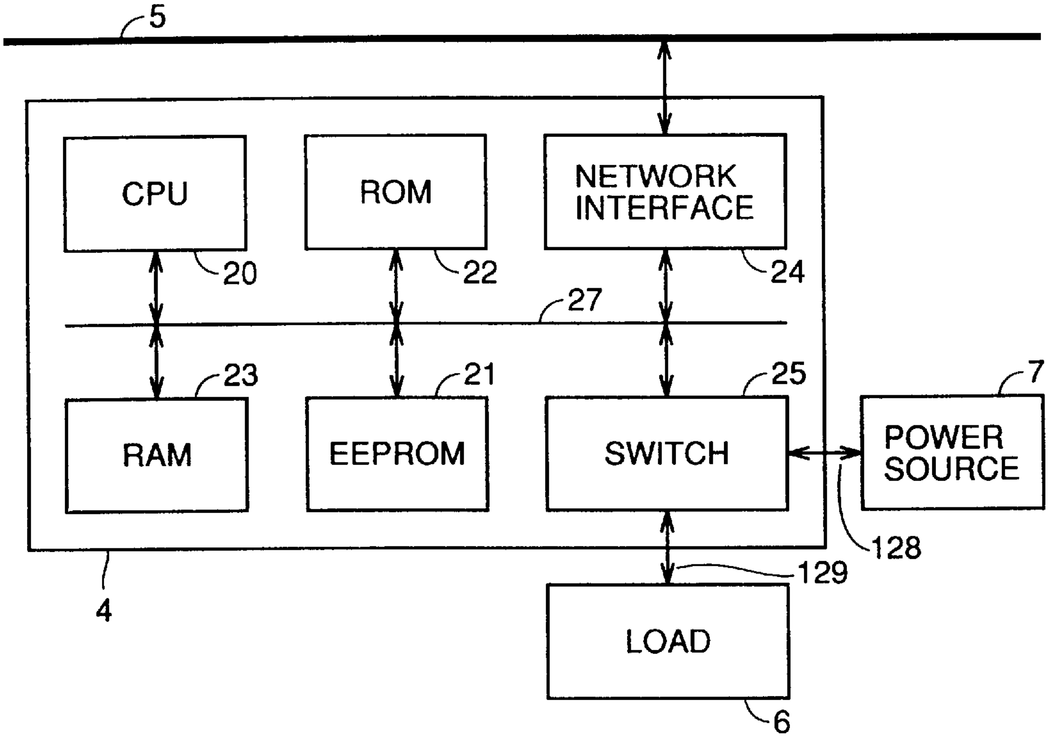
FIG. 3 is a diagram for illustrating a typical structure of a receiver 4 in the first embodiment of the present invention.

A typical structure of each receiver 4 in the first embodiment of the present invention is described with reference to FIG. 3. FIG. 3 shows a structure for performing power control on an apparatus (load) connected with the receiver 4.

Referring to FIG. 3, the receiver 4 includes a CPU 20, an EEPROM 21, a ROM 22 storing various programs including a switch control program and a command recognition program, a RAM 23 for executing the programs stored in the ROM 22, a network interface 24 enabling bidirectional communication between the network 5 and the receiver 4, a switch 25 and a bus 27.

The CPU 20 controls the EEPROM 21, the ROM 22, the RAM 23, the network interface 24 and the switch 25 through the bus 27 respectively. The EEPROM 21 stores the unique ID number of the receiver 4.

The switch 25 is connected with a power source 7 through an electric line 128, and connected with a load 6 through an electric line 129. The load 6 is formed by a luminaire or a sprinkler, for example.

In accordance with the command recognition program, the receiver 4 compares the ID number included in the command received from the control unit 1 through the network 5 with the ID number stored in the EEPROM 21. When these ID numbers match with each other, the receiver 4 supplies power to the load 6 from the power source 7 through the switch 25 in accordance with the switch control program.

Figure 4:
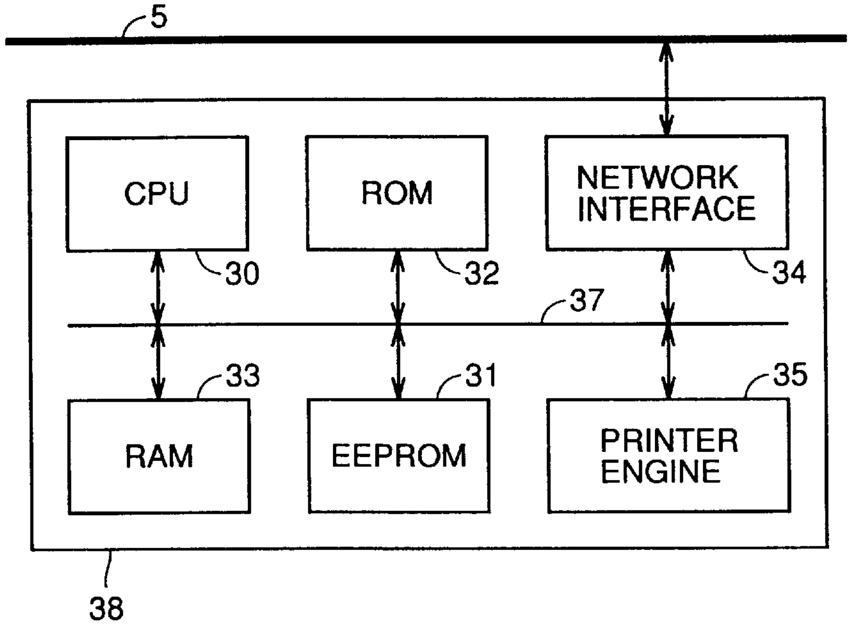
FIG. 4 is a diagram for illustrating another typical structure of the receiver in the first embodiment of the present invention.

Another typical receiver in the first embodiment of the present invention is described with reference to FIG. 4. FIG. 4 shows a printer 38 including the receiver 4 arranged for the network 5.

Referring to FIG. 4, the printer 38 includes a CPU 30, an EEPROM 31, a ROM 32 storing various programs including a printing program and a command recognition program, a RAM 33 for executing the programs stored in the ROM 32, a network interface 34 implementing bidirectional communication between the printer 38 and the network 5, a printer engine 35 for executing a printing operation in accordance with the programs stored in the ROM 32, and a bus 37.

The CPU 30 controls the EEPROM 31, the ROM 32, the RAM 33, the network interface 34 and the printer engine 35 through the bus 37 respectively. Parts of the CPU 30, the EEPROM 31, the ROM 32 and the RAM 33 and the network interface 34 serve as the receiver 4. The EEPROM 31 stores an unique ID number of the printer 38. The network 5 is formed by a USB, for example.

In accordance with the command recognition program, the printer 38 compares the ID number included in the command received from the control unit 1 through the network 5 with the ID number stored in the EEPROM 31. When these ID numbers match with each other, the printer 38 drives the printer engine 35 and executes printout in accordance with the printing program.

A procedure of forming the network 5 in the remote control system 1000 is now described with reference to FIG. 5.

Figure 5:
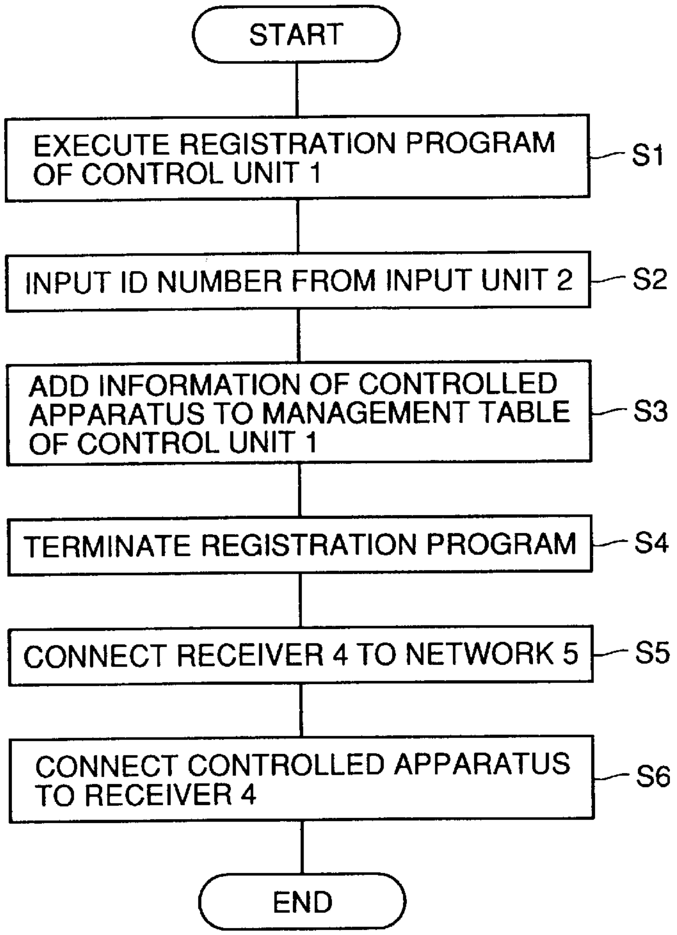
FIG. 5 is a flow chart for illustrating a procedure of forming a network in the remote control system 1000.

Referring to FIG. 5, the registration program of the control unit 1 is executed for arranging a new receiver for the network 5 (step S1). For example, the registration program of the control unit 1 is started by input of a command from the input unit 2.

The user inputs the ID number of the newly arranged receiver through the input unit 2 (step S2). For example, the user manually inputs the ID number through a keyboard.

Figures 10, 11:
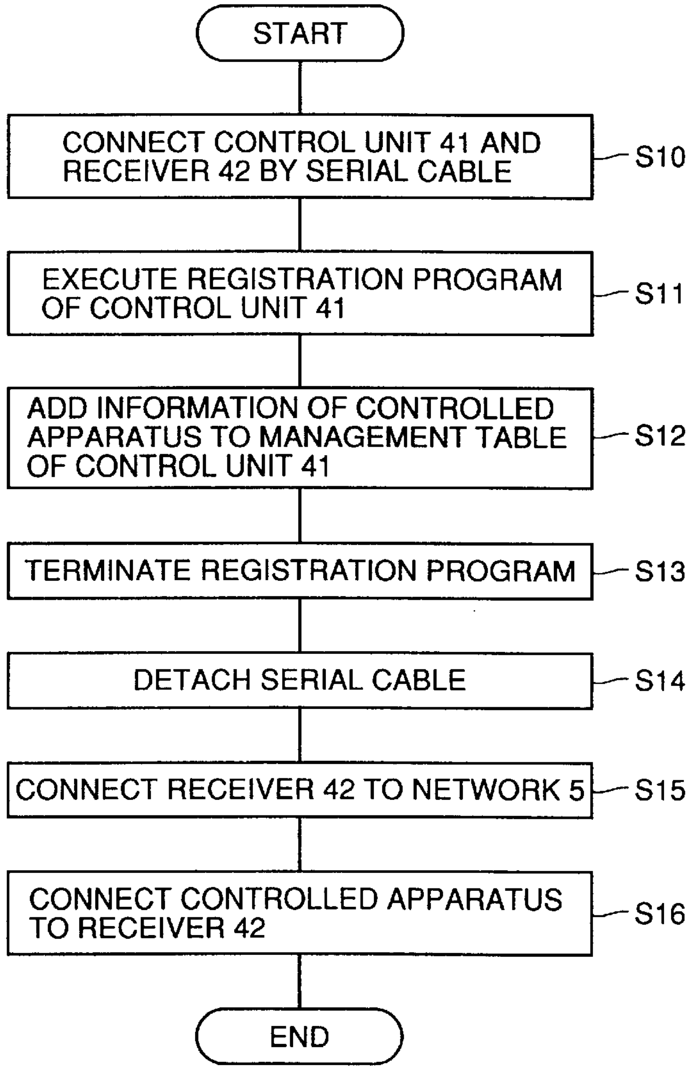
FIG. 10 is a flow chart for illustrating a procedure of forming a network in the remote control system 2000.
FIG. 11 is a conceptual diagram showing typical contents of a display screen in a display unit 3.
Figure 12:
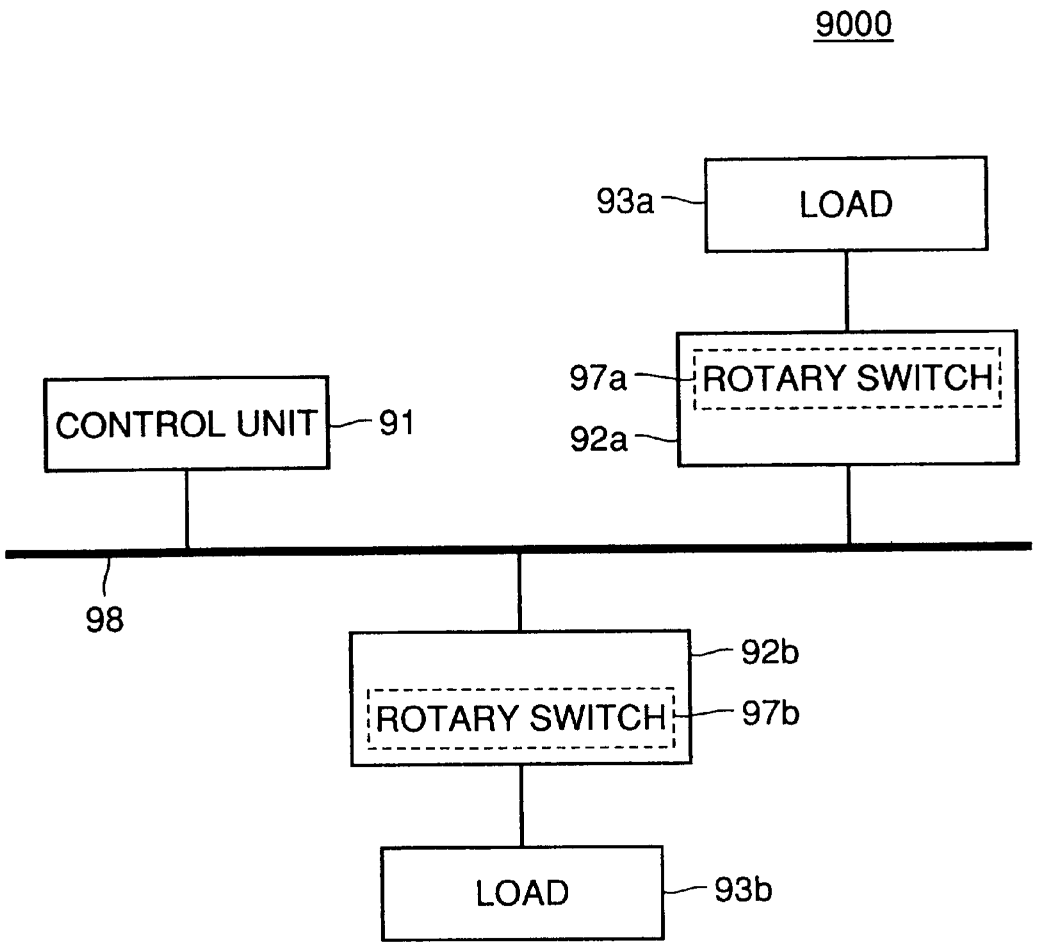
FIG. 12 PRIOR ART
FIG. 12 is a diagram for illustrating a conventional remote control system 9000.

The user additionally records information of the receiver in association with the ID number newly registered in the management table of the control unit 1 through the input unit 2 (step S3). For example, the user inputs "1F TV (television on the first floor)", "2F bedside lamp (bedside lamp in a bedroom on the second floor)" or the like as the name of the controlled object, so that the controlled object (load) can be readily recognized. A display screen 55 of the display unit 3 displays ID numbers, names of the corresponding controlled objects (names of the loads) and the like as shown in FIG. 11, for example.

Referring again to FIG. 5, the registration program is terminated (step S4). The newly registered receiver is connected to the network 5 (step S5). If the network 5 is formed by a power line, for example, the receiver is connected to a socket in the room for using the receiver. The receiver is connected with an apparatus (e.g., a sprinkler forming a load) to be controlled (step S6). When performing power control, the receiver is connected to a power source.

When the control unit 1 transmits a command for turning on a load including a specific ID number, the switch included in the receiver storing the specific ID number is turned on to drive the corresponding load. Further, the control unit 1 drives the specific printer 38.

Thus, also when arranging a plurality of receivers of the same type for the network, it is possible to distinctively manage/control the receivers.

[Second Embodiment]

A remote control system 2000 according to a second embodiment of the present invention is described with reference to FIG. 6. In the following description, components identical to those in the first embodiment are denoted by the same reference numerals and symbols, and redundant description is not repeated.

Figure 6:
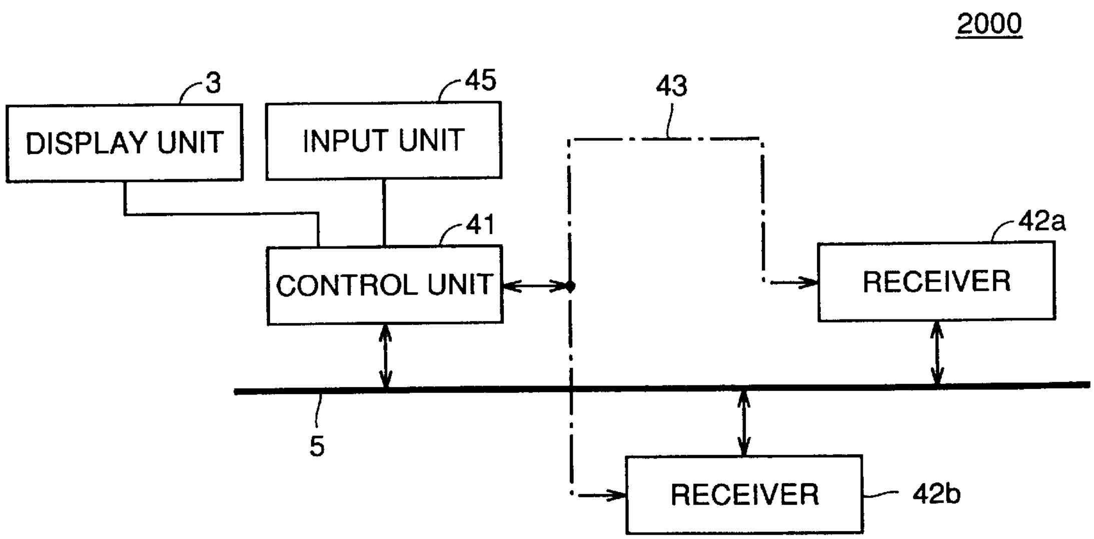
FIG. 6 is a diagram for illustrating a remote control system 2000 according to a second embodiment of the present invention.

The remote control system 2000 shown in FIG. 6 includes a plurality of receivers arranged for a network 5, a control unit 41 controlling the receivers through the network 5, a display unit 3 and an input unit 4.

FIG. 6 shows typical receivers 42*a* and 42*b* (hereinafter generically referred to as receivers 42). Each receiver 42 includes a nonvolatile memory for storing an unique ID number. The ID number is written in the nonvolatile memory in shipping.

The control unit 41 includes a memory for storing ID numbers received through a second network 43. The ID number of each receiver 42 is transmitted to the control unit 41 through the second network 43. The network 5 is hereinafter referred to as a first network 5.

The user registers information of the receivers 42 such as the information of apparatuses controlled by the receivers 42, for example, in a management table through the input unit 45. The input unit 45 is formed by a keyboard, for example. For example, a personal computer including a keyboard (input unit 45) and a display (display unit 3) is arranged.

A typical structure of the control unit 41 in the second embodiment of the present invention is described with reference to FIG. 7.

Figure 7:
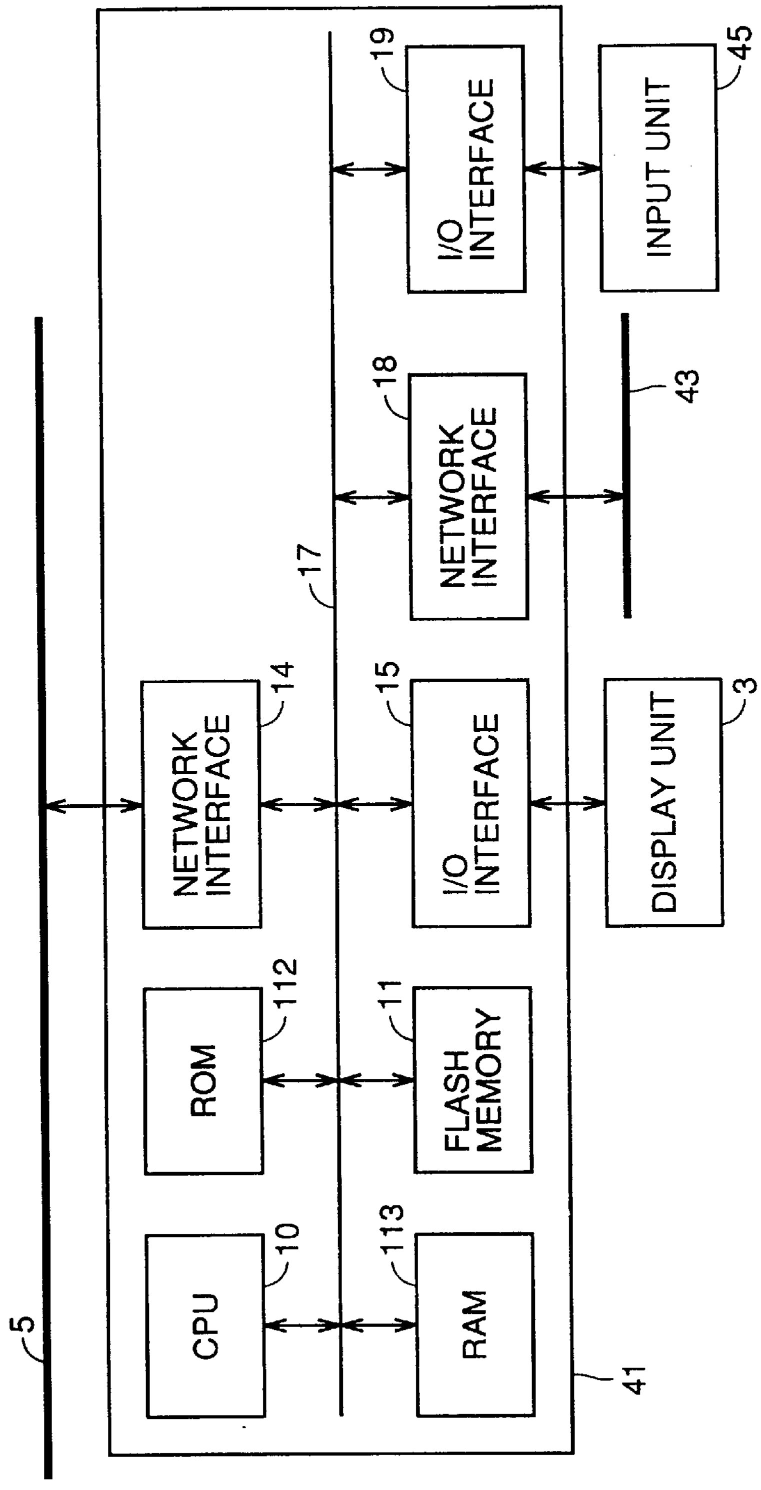
FIG. 7 is a diagram for illustrating a typical structure of a control unit 41 in the second embodiment of the present invention.

Referring to FIG. 7, the control unit 41 includes a CPU 10, a flash memory 11, a ROM 1 12 storing various programs including a registration program and a control program, a RAM 113 for executing the programs stored in the ROM 112, a network interface 14, an I/O interface 15, an I/O interface 19 enabling bidirectional communication between the input unit 45 and the control unit 41, a bus 17, and a network interface 18 for implementing bidirectional communication between the second network 43 and the control unit 41.

The CPU 10 controls the flash memory 11, the ROM 112, the RAM 113, the network interfaces 14 and 18 and the I/O interfaces 15 and 19 through a bus 17 respectively.

The control unit 41 captures the ID numbers of the receivers 42 through the second network 43 and stores (registers) the same in the flash memory 11 in accordance with the registration program. The control unit 41 controls the plurality of receivers 42 in accordance with the stored ID numbers respectively. More specifically, the control unit 41 reads the ID number corresponding to a selected receiver 42 from the flash memory 11 and issues a command for making the receiver 42 execute a specific operation including the read ID number in accordance with the control program.

The control unit 41 is not restricted to that shown in FIG. 7. For example, the information stored in the flash memory 11 may be stored in the RAM 113. The ROM 112 maybe deleted so that the flash memory 11 stores the programs. The first network 5 and the second network 43 may be formed by (share) a signal transmission line having a common communication protocol specification, while arranging only either network interface 14 or 18.

Figure 8:
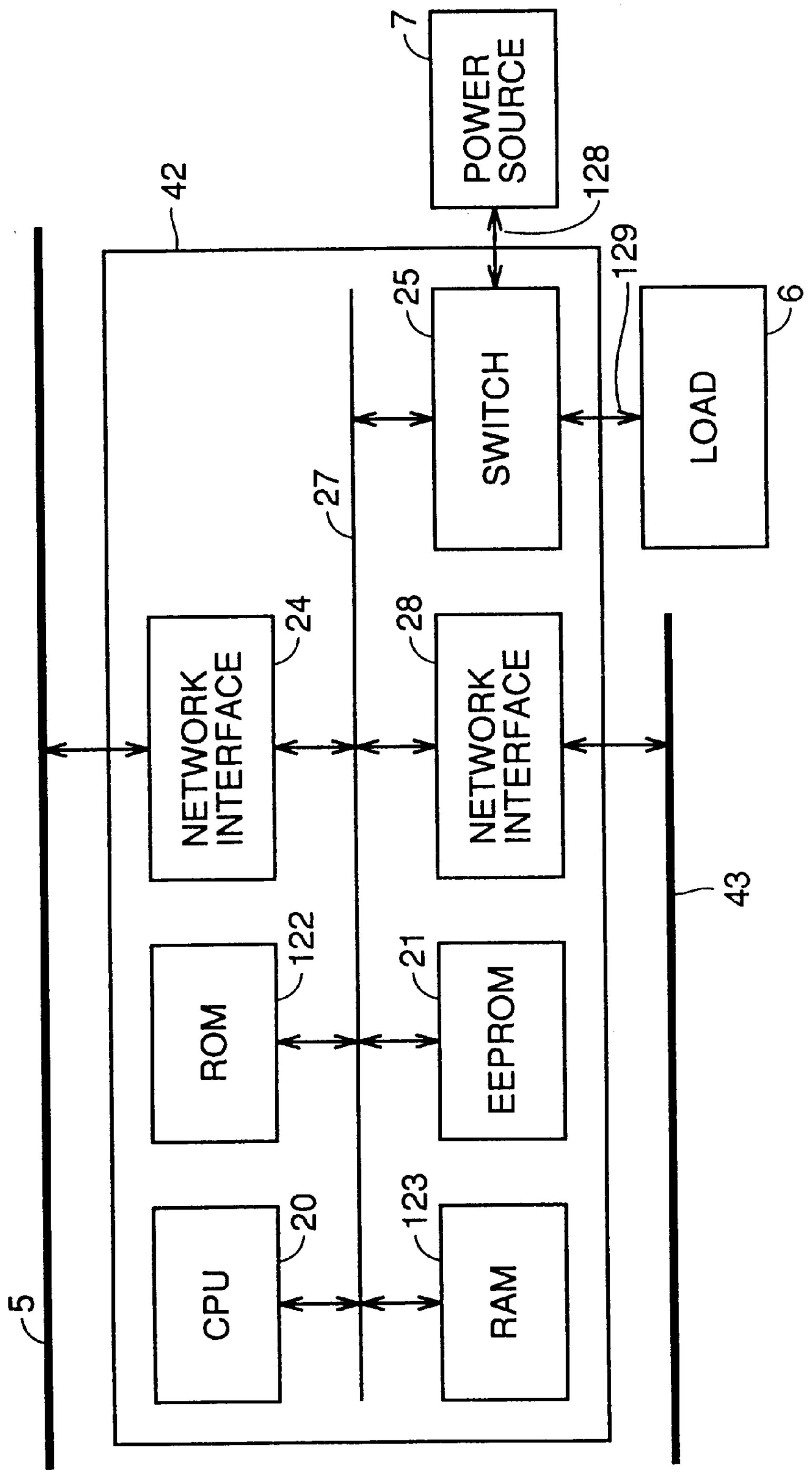
FIG. 8 is a diagram for illustrating a typical structure of a receiver 42 in the second embodiment of the present invention.

A typical structure of each receiver 42 in the second embodiment of the present invention is described with reference to FIG. 8. FIG. 8 shows a structure for power-controlling an apparatus (load) 6 connected with the receiver 42.

Referring to FIG. 8, the receiver 42 includes a CPU 20, an EEPROM 21, a program ROM 122 storing various programs including a switch control program, a command recognition program and a transmission program, a RAM 123 for executing the programs stored in the ROM 122, a network interface 24, a switch 25, a bus 27, and a network interface 28 for implementing bidirectional communication between the receiver 42 and the second network 43.

The CPU 20 controls the EEPROM 21, the ROM 122, the RAM 123, the network interfaces 24 and 28 and the switch 25 through the bus 27 respectively.

The receiver 42 transmits an ID number stored in the EEPROM 21 to the second network 43 in accordance with the transmission program. Thus, the ID number of the receiver 42 is automatically registered in the control unit 41.

The receiver 42 further compares the ID number included in the command received from the control unit 41 through the first network 5 with the ID number stored in the EEPROM 21 in accordance with the command recognition program. When the ID numbers match with each other, the receiver 42 supplies power to the load 6 from a power source 7 through the switch 25 in accordance with the switch control program.

The first network 5 and the second network 43 may be formed by (share) a signal transmission line having a common communication protocol specification, while arranging only either network interface 24 or 28.

The second network 43 can be formed by a cable such as a power line, a USB, an IEEE 1394 bus, RS-232C, a telephone line or the like or a wireless channel employing a radio wave or infrared radiation.

Figure 9:
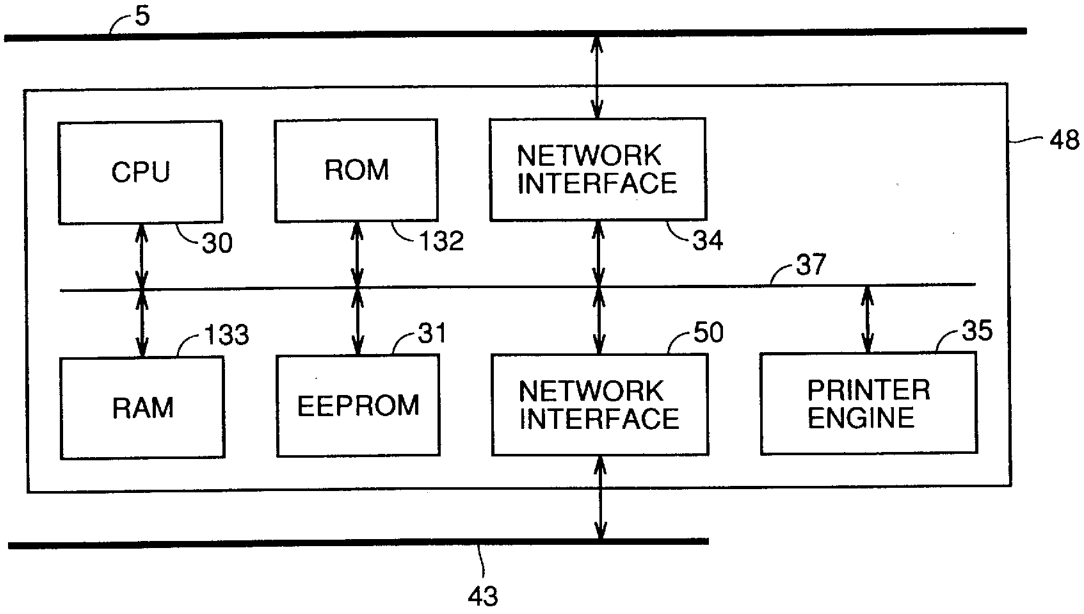
FIG. 9 is a diagram for illustrating another typical structure of the receiver in the second embodiment of the present invention.

Another typical structure of the receiver in the second embodiment of the present invention is described with reference to FIG. 9. FIG. 9 shows a printer 48 including the receiver 42 arranged for the first network 5.

Referring to FIG. 9, the printer 48 includes a CPU 30, an EEPROM 31, a ROM 132 storing various programs including a printing program, a command recognition program and a transmission program, a RAM 133 for executing the programs stored in the ROM 132, network interfaces 34 and 50, a printer engine 35 and a bus 37. The network interface 50 implements bidirectional communication between the second network 43 and the printer 48.

The CPU 30 controls the EEPROM 31, the ROM 132, the RAM 133, the network interfaces 34 and 50 and the printer engine 35 through the bus 37 respectively.

Parts of the CPU 30, the EEPROM 31, the ROM 132 and the RAM 133 and the network interfaces 34 and 50 serve as the receiver 42. The first network 5 is formed by a USB, for example.

The printer 48 transmits an unique ID number stored in the EEPROM 31 to the second network 43 in accordance with the transmission program. Thus, the ID number of the printer 48 is automatically registered in the control unit 41.

The printer 48 further compares the ID number included in the command received from the control circuit 41 through the first network 5 with the ID number stored in the EEPROM 31. When the ID numbers match with each other, the printer 48 drives the printer engine 35 for executing printout in accordance with the printing program.

A procedure of forming the network 5 in the remote control system 2000 is now described with reference to FIG. 10.

Referring to FIG. 10, the control unit 41 is connected with a receiver newly arranged for the network 5 through the second network 43 (a serial cable RS-232C, for example) (step S10).

The registration program of the control unit 41 is executed (step S11). The unique ID number of the receiver is automatically input in the control unit 41 through the serial cable. The user additionally records the information of the receiver through the input unit 45 in association with the ID number newly registered in the management table of the control unit 41 (step S12). FIG. 11 shows a typical display screen 5 of the display unit 3.

Referring again to FIG. 10, the registration program is terminated (step S13) and the serial cable is detached (step S14) after completion of the aforementioned operations. The newly registered receiver is connected to the network 5 (step S15). When the network 5 is formed by a power line, for example, the receiver is connected to a socket in the room for using the receiver. The receiver is connected with an apparatus (e.g., a sprinkler forming a load) to be controlled (step S16). When performing power control, the receiver is connected to a power source.

Thus, also when arranging a plurality of receivers of the same type for the network, it is possible to distinctively automatically manage/control the receivers. The ID numbers of the receivers are automatically registered in the control unit 41, whereby a burden on the user can be suppressed for preventing erroneous input.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control system comprising:

a plurality of receivers each supplied with an unique identification number;

a control unit remotely controlling each of said plurality of receivers through a network; and an input unit inputting said identification number of each of said plurality of receivers; wherein said control unit includes:

a first memory storing said identification number input from said input unit, an operation control circuit issuing a command for making selected said receiver execute a specific operation with said identification number stored in said first memory, and a transmission circuit for transmitting said command to said network; and each of said plurality of receivers includes a second memory storing said identification number, a receiving circuit for receiving said command from said network and a circuit recognizing said command, and executes said specific operation when said identification number included in said command matches with said identification number stored in said second memory.

2. The remote control system in accordance with claim 1, wherein said second memory includes a nonvolatile memory.

3. The remote control system in accordance with claim 2, wherein said identification number is printed on a case of each of said plurality of receivers, said input unit includes a keyboard, and a user inputs said identification number printed on said case from said keyboard.

4. The remote control system in accordance with claim 2, wherein said identification number is printed on a case of each of said plurality of receivers, and said input unit includes an image scanner unit recognizing and capturing said identification number printed on said case.

5. The remote control system in accordance with claim 2, wherein said identification number is printed on a case of each of said plurality of receivers in the form of a bar code, and said input unit includes a bar code reader capturing said bar code printed on said case.

6. The remote control system in accordance with claim 2, wherein said identification number is printed on a case of each of said plurality of receivers, said input unit includes a personal computer including a keyboard and a display supporting input through said keyboard, and a user inputs said identification number printed on said case from said keyboard.

7. A remote control system comprising:

a plurality of receivers each supplied with an unique identification number; and a control unit issuing a command and remotely controlling each of said plurality of receivers through a network on the basis of said command, wherein each of said plurality of receivers includes:

a first memory storing said identification number, and a first transmission/receiving circuit transmitting said identification number read from said first memory to said network and receiving said command from said network, said control unit includes:

a second transmission/receiving circuit receiving said identification number from said network and transmitting said command to said network, a second memory storing said received identification number, and an operation control circuit issuing said command for making selected said receiver execute a specific operation with said identification number stored in said second memory, and each of said plurality of receivers executes said specific operation when said identification number included in said command matches with said identification number stored in said first memory.

8. The remote control system in accordance with claim 7, wherein said first memory includes a nonvolatile memory.

9. The remote control system in accordance with claim 8, wherein said network includes:

a first network transmitting said identification number, and a second network transmitting said command, said first transmission/receiving circuit includes:

a first transmission circuit corresponding to said first network, and a first receiving circuit corresponding to said second network, and said second transmission/receiving circuit includes:

a second receiving circuit corresponding to said first network, and a second transmission circuit corresponding to said second network.

10. A receiver used in a remote control system, said receiver connected to a network and an electrical apparatus and receiving a command from a control unit via said network to make said electrical apparatus execute an operation according to said command, comprising:

a nonvolatile memory storing an identification number unique to said receiver;

an interface circuit receiving said command from said network; and an operation circuit comparing an identification number included in said command received by said interface circuit with the unique identification number stored in said nonvolatile memory for making said electrical apparatus execute an operation according to said command if the identification numbers match with each other, said unique identification number having been stored already in said nonvolatile memory when said receiver is shipped from a factory.

11. The receiver according to claim 10, further comprising a case enclosing said nonvolatile memory, said interface circuit and said operation circuit, wherein a symbol representing said unique identification number is indicated on said case.

12. The receiver according to claim 10, further comprising a transfer interface circuit transferring said unique identification number stored in said nonvolatile memory to said control unit via a network different from said network.

* * * * *